(12) United States Patent
Smith et al.

(10) Patent No.: US 7,447,896 B2
(45) Date of Patent: Nov. 4, 2008

(54) OS MINI-BOOT FOR RUNNING MULTIPLE ENVIRONMENTS

(75) Inventors: Frederick J. Smith, Redmond, WA (US); Jeff L. Havens, Issaquah, WA (US); Madhusudhan Talluri, Bellevue, WA (US); Yousef A. Khalidi, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 415 days.

(21) Appl. No.: 11/301,066

(22) Filed: Dec. 12, 2005

(65) Prior Publication Data

US 2007/0134068 A1 Jun. 14, 2007

(51) Int. Cl.
*G06F 9/24* (2006.01)
(52) U.S. Cl. .............................. 713/2; 707/9
(58) Field of Classification Search ........... 713/2; 187/100; 707/101, 9; 718/100
See application file for complete search history.

(56) References Cited

U.S. PATENT DOCUMENTS

| | | | |
|---|---|---|---|
| 6,374,286 B1 | 4/2002 | Gee et al. | 709/108 |
| 6,961,941 B1 | 11/2005 | Nelson et al. | 719/319 |
| 7,103,661 B2 * | 9/2006 | Klein | 709/225 |
| 7,188,339 B2 * | 3/2007 | Qureshi | 717/140 |
| 2006/0282658 A1 * | 12/2006 | Tang | 713/2 |

FOREIGN PATENT DOCUMENTS

EP 1 475 703 A2 11/2004

OTHER PUBLICATIONS

Wright, C., Kernel Korner—Unionfs: bringing filesystems together, *Linux Journal*, 2004, http://www.linuxjournal.com/article/7714, downloaded from the Internet on Apr. 27, 2006, 18 pages.

* cited by examiner

*Primary Examiner*—Thuan N Du
(74) *Attorney, Agent, or Firm*—Woodcock Washburn LLP

(57) ABSTRACT

An intra-operating system isolation mechanism called a silo provides for the grouping and isolation of processes running on a single computer using a single instance of the operating system. The operating system enables the controlled sharing of resources by providing a view of a system name space to processes executing within an isolated application called a server silo. A server silo is created by performing a separate "mini-boot" of user-level services within the server silo. The single OS image serving the computer employs the mechanism of name space containment to constrain which server silos can use which resource(s). Restricting access to resources is therefore directly based on the process or application placed in the server silo rather than who is running the application because if a process or application is unable to resolve a name used to access a resource, it will be unable to use the resource.

20 Claims, 3 Drawing Sheets

OS MINI-BOOT FOR RUNNING MULTIPLE ENVIRONMENTS

CROSS-REFERENCE TO RELATED CASES

This application is related in subject matter to U.S. patent application Ser. No. 11/301,093, entitled "Using Virtual Hierarchies to Build Alternative Namespaces" filed herewith, U.S. patent application Ser. No. 11/301,071, entitled "Use of Rules Engine to Build Namespaces" filed herewith, U.S. patent application Ser. No. 11/301,072, entitled "Mechanism for Drivers to Create Alternate Namespaces" filed herewith, and U.S. patent application Ser. No. 11/301,065, entitled "Building Alternative Views Of Name Spaces" filed herewith.

BACKGROUND

When a single computer is used to run multiple workloads, a balance should be struck between isolation of applications and the cost of using and administering the application-isolating system. Applications should ideally be isolated from each other so that the workload of one application does not interfere with the operation or use of resources of another application. On the other hand, the system should be flexible and manageable to reduce the cost of using and administering the system. Ideally, the system should be able to selectively share resources while maintaining application isolation. Typically, however, all processes running under the same user account have the same view of system resources. The lack of isolation of the applications running on a particular computer contributes to application fragility, application incompatibility, security problems and the inability to run conflicting applications on the same machine.

A number of different solutions have been proposed which address one or more aspects of the problems discussed above. One way to isolate applications running on the same machine is to run the applications on different "virtual machines". A virtual machine (VM) enables multiple instances of an operating system (OS) to run concurrently on a single machine. A VM is a logical instance of a physical machine, that is, a virtual machine provides to the operating system software an abstraction of a machine at the level of the hardware: that is, at the level of the central processing unit (CPU), controller, memory, and so on. Each logical instance has its own operating system instance with its own security context and its own isolated hardware resources so that each operating system instance appears to the user or observer to be an independent machine. VMs are typically implemented to maximize hardware utilization. A VM provides isolation at the level of the machine but within the virtual machine, no provisions for isolating applications running on the same VM are provided for by known VM implementations.

Other known proposed solutions to aspects of the problems described above include Sun Microsystem's Solaris Zones, jails for UNIX BSD and Linux, the VServers project for Linux, SWSoft's Virtuozzo, web hosting solutions from Ensim and Sphera, and software available from PolicyMaker, and Softricity.

Another approach that addresses aspects of application isolation is hardware partitioning. A multi-processor machine is divided into sub-machines, each sub-machine booting an independent copy of the OS. Hardware partitioning typically only provides constrained resource allocation mechanisms (e.g., per-CPU allocation), does not enable input/output (IO) sharing and is typically limited to high-end servers.

Hence, in many systems, limited points of containment in the system exist at the operating system process level and at the machine boundary of the operating system itself, but in between these levels, security controls such as Access Control Lists (ACLs) and privileges associated with the identity of the user running the application are used to control process access to resources. There are a number of drawbacks associated with this model. Because access to system resources is associated with the identity of the user running the application rather than with the application itself, the application may have access to more resources than the application needs. Because multiple applications can modify the same files, incompatibility between applications can result. There are a number of other well-known problems as well.

There is no known easy and robust solution using known mechanisms that enables applications to be isolated while still allowing controlled sharing of resources. It would be helpful if there were a mechanism that allowed an application, process, group of applications or group of processes running on a single machine to be isolated using a single operating system instance while enabling controlled sharing of resources.

SUMMARY

An intra-operating system isolation/containment mechanism, called herein a silo, provides for the grouping and isolation of processes running on a single computer using a single instance of the operating system. A single instance of the operating system enables the partitioning and controlled sharing of resources by providing a view of a system name space to processes executing within an isolated application environment called a server silo. A system may include a number of silos (i.e., one infrastructure silo and one or more server silos) and a number of system name spaces. An infrastructure silo is the root or top-level silo to which the entire system name space is visible. Each isolated application environment or server silo may be provided with its own view of a system name space so that only a subset of the system name space is visible to the server silo. Thus, a set of related and/or non-conflicting applications may be installed in one server silo and another set of conflicting applications may be installed in a second server silo. Because each server silo "sees" a different subset of the system name space, and in addition, may have its own set of silo-specific files, applications that would otherwise conflict with each other can run simultaneously on the same machine without conflict. Thus, multiple server silos can be used to isolate or separate different sets of applications enabling a number of conflicting applications to be run on the same computer without experiencing the problems which typically ensue from running conflicting applications on the same computer. Applications can be added to a server silo or removed from a server silo without impacting the infrastructure silo, other server silos or the applications that run in the other server silos.

A server silo may run existing applications: that is, applications do not have to be modified to run in the server silo. The applications installed in the server silo do not need to be modified because the server silo's name space is renamed or remapped so that references within programs do not need to be changed. For example, a reference to a file at "\SILO\SILO1\WINDOWS" may be mapped or renamed to "\WINDOWS" in the server silo's view. Each server silo may be created by performing a separate "mini-boot" of user-level services within the server silo. The single OS image serving the computer employs the mechanism of name space containment to constrain which server silo(s) can use which resource (s). Restricting access to resources is therefore directly associated with or based on the process or application placed in the server silo rather than on who is running the application because if a process or application is unable to resolve a name used to access a resource, it will be unable to use the resource. Management of the computer may be divided up. Certain administrative tasks may be delegated to a server silo administrator who can control his own server silo but cannot affect other server silos running on the same system. Server silos enable a less privileged administrator to handle routine management of the server silo running that administrator's applications, striking a balance between isolation and flexibility. Server silos enable multiple instances of the same application to run on the same system.

Name space isolation with controlled sharing may be implemented by creating a silo-specific view of a global or system name space for each server silo. Each server silo may have a subset view of hierarchical name spaces, number spaces, number/name spaces, and network compartments.

DETAILED DESCRIPTION

Overview

Figure 1:
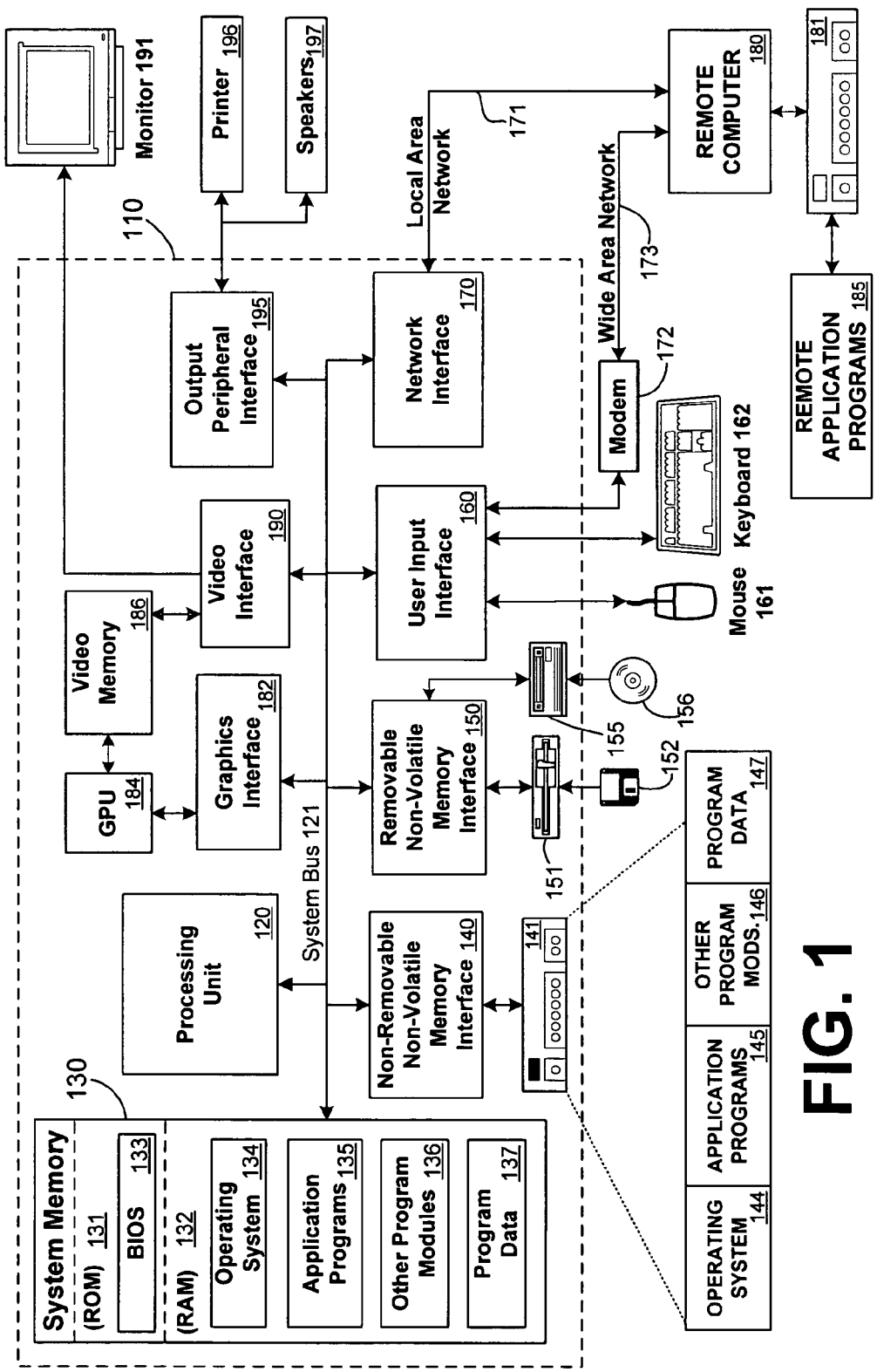
FIG. 1 is a block diagram illustrating an exemplary computing environment in which aspects of the invention may be implemented.

It is advantageous at times to be able to run multiple application environments on the same computer. For example, a business enterprise may have a number of servers that each run a service that the enterprise would like to consolidate onto a single machine so that there are not so many machines to manage. For example, the Human Resources department, the purchasing department and the payroll department may each have an email server running on a separate machine that they would like to run on the same machine. Similarly, it may be desirable to consolidate a numbers of separate servers onto a single machine that performs the functions of all of the separate servers (e.g., to consolidate a separate email server, web server, file server and printer server onto a single server that performs email, web, file and print services.) A business enterprise may have a web server for hosting web sites or for providing web services. In each case, the applications running in one environment should be kept separate from the others. In other words, the success of the venture may depend on keeping separate environments separate. Typically, however, this is not an easy task. When two server applications are placed on the same machine, frequently name conflicts arise, one application overwrites another's application's files, version problems surface and so on.

An effective solution for the above problem statement may fulfill the following requirements: applications should be isolated; applications should not need to be modified in order to run within the application environment; a single kernel or operating system should run on the system; and administrative tasks should be shared. Isolation of applications implies that multiple instances of the same application should be able to run at the same time and/or on the same machine; applications should be able to be added to or removed from one application environment without affecting any other environment on the system; and different versions of the same application should be able to run at the same time. That applications should not need to be modified in order to run within the application environment implies that applications should be able to use the same names and references regardless of where they run (inside or outside the isolated environment). Running a single kernel or OS implies efficiencies of operation because only one instance of the OS has to be maintained. For example, all the hardware management and drivers only need to be set up once. Administrative tasks should be shared so that routine administrative tasks for the application environment could be delegated to an application environment administrator. The application environment administrator should be able to affect only his own environment.

One solution to the above provides a mechanism for application isolation by creating one or more sandboxed silos for running existing (unmodified) applications by creating multiple server silos each having a view of a subset of the system name space(s) and renaming or remapping the names in the silo name space to known names. To create a server silo, a user-level partial boot may be performed within the new server silo after the kernel portion of the operating system is started. Details are provided below.

Exemplary Computing Environment

FIG. 1 and the following discussion are intended to provide a brief general description of a suitable computing environment in which the invention may be implemented. It should be understood, however, that handheld, portable, and other computing devices of all kinds are contemplated for use in connection with the present invention. While a general purpose computer is described below, this is but one example, and the present invention requires only a thin client having network server interoperability and interaction. Thus, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 100 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 100 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 100 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of coprocessing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 100 is connected to the LAN 171 through a network interface or adapter 170. When used in a WAN networking environment, the computer 100 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

One of ordinary skill in the art can appreciate that a computer 100 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

Using Mini-Boot of OS to Create and Maintain Multiple Application Environments

In some embodiments of the invention, multiple application environments can be created and maintained by creating multiple server silos, each having a view of a subset of the system name space(s) and performing a mini-boot or partial additional boot or re-boot of at least some user-level system services within each server silo. A mini-boot is an additional or second boot of a subset of the system boot processes. This mini-boot occurs within the server silo. That is, if the regular system boot runs processes A-H, the mini-boot may re-run some subset of processes A-H. In some embodiments of the invention, the mini-boot also runs additional processes not in the system boot. In some embodiments of the invention, all of the processes of the mini-boot are user-mode processes. In some embodiments of the invention, the mini-boot takes place immediately following the system boot and appears to a user to be part of the regular boot process. Prior to mini-boot, the server silo may be pre-populated with all or some parts of private or silo-specific name spaces enabling controlled sharing of some resources, while restricting access of the server silo to other resources, thereby facilitating resource management. Management of the environments may be shared between a system administrator and one or more server silo administrators.

Figure 2:
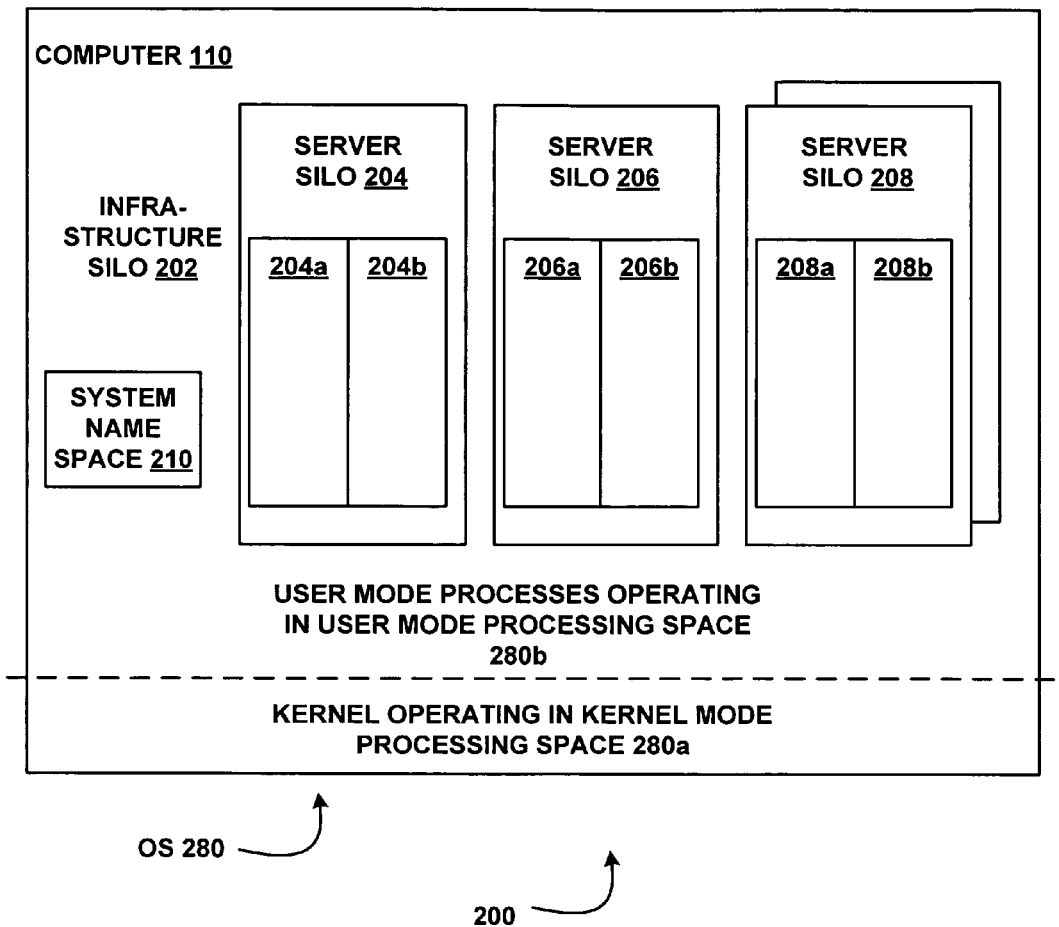
FIG. 2 is a block diagram of a system for creating and maintaining separate environments in accordance with some embodiments of the invention.

FIG. 2 is a block diagram illustrating a system for creating and maintaining separate environments in accordance with some embodiments of the invention. System 200 may reside on a computer such as the one described above with respect to FIG. 1. System 200 may include one or more partitions (not shown). A drive letter abstraction may be provided at the user level to distinguish one partition from another. For example, the path C:\WINDOWS\ may represent a directory WINDOWS on the partition represented by the letter C. Each drive letter or partition may be associated with a hierarchical data structure. Each hierarchy has a root which represents the first or top-most node in the hierarchy. It is the starting point from which all the nodes in the hierarchy originate. As each device may be partitioned into multiple partitions, multiple roots may be associated with a single device. (For example, a user's physical hard disk may be partitioned into multiple logical "disks", each of which have their own "drive letter" and their own root.) A single instance of the operating system images serves all the partitions of the computer in some embodiments of the invention.

Within each partition, system 200 may include one or more isolated application environments. In some embodiments of the invention, the isolated application environments are server silos (e.g., server silo 204, server silo 206 and server silo 208). Infrastructure silo 202 represents a root or top-level silo. Although FIG. 2 illustrates an infrastructure silo and three server silos, it will be appreciated that the invention as contemplated is not so limited. Any number of server silos (from none to any suitable number) may be created. Infrastructure silo 202 may be associated with one or more system or global name spaces, represented in FIG. 2 by system name space 210. Various types of system name spaces including hierarchical name spaces, number spaces, number/name spaces, and network compartments may exist. Each server silo may have a subset view of these system name spaces.

Hierarchical name spaces may include but are not limited to one or more of: a registry name space, a system objects or object manager name space and a file system name space. Number space name spaces may include unique identifiers and well-known constants across the system and may include session identifier name spaces and process identifier name spaces. Number/Name spaces may include unique identifiers used by all the silos including IP addresses, ports, LUIDs (Logon User Identification) and GUIDs (Global Unique Identifier). Network compartments are another type of name space. Network compartments may be used by the operating system to direct network traffic to the appropriate silo. Server silos may have a virtual NIC (Network Interface Card) interface through a mux driver that multiplexes multiple virtual NICs thru a set of physical NICs.

System 200 may also include an operating system 280. The operating system 280 may include one or more operating system components including but not limited to an operating system kernel and an object manager. In some embodiments of the invention, the object manager is a component of the operating system kernel. In some embodiments of the invention, some portions of the operating system operate in kernel mode 280a while others operate in user mode 280b. A mode is a logical and systematic separation of services, functions, and components. Each mode has specific abilities and code components that it alone uses to provide the functions and perform the tasks delegated to it. Kernel mode is also known as the privileged processor mode (PPM). The kernel resides in the kernel mode process space along with its support structures, hardware interface drivers, and resource services. Applications and users operate in a process space that is isolated from the hardware known as user mode. User mode components access system resources and hardware by requesting the kernel mode for access to the system resources. For example a user mode process may request the kernel mode for access to a hardware resource such as a disk drive. Elements within the kernel mode execute the request on behalf of the user mode process and return the results.

Booting is the process of loading the operating system onto a computer. Booting usually happens automatically when a computer is turned on. The regular system boot in some systems includes loading both kernel-mode and user-mode processes. In some embodiments of the invention, an additional boot process for a server silo includes additional steps that re-do portions of the system boot for the specific server silo or perform server silo-specific tasks.

An administrator of the infrastructure silo 202 may create one or more server silos. In some embodiments of the invention, the infrastructure silo administrator defines a server silo by specifying one or more silo-specific name space(s) to be constructed, by specifying which devices are to exposed to the server silo and by specifying the properties of the silo-specific name space(s). Kernel 280a in some embodiments of the invention maintains the application environment isolation and the constrained view of the system name spaces for the server silos. The kernel is silo-aware, meaning, for example, that the kernel is able to distinguish a request or response that comes from a server silo from a system request/response and is able to identify which server silo issued the request/response and is able to identify the silo-specific name space(s) associated with the server silo making the request/response. In some embodiments of the invention, only limited changes to the standard kernel are required in order to make the kernel silo-aware because: accesses to the server silo name spaces are performed as a user process in which the context is automatically scoped to the silo-specific name space; devices which are not silo-aware are not exposed to the silo; applications access devices via a protocol or higher level interface; relative opens are scoped to the silo context via name space control; a mechanism to temporarily switch a thread to a silo thread is used when work is deferred (e.g., when waiting for another thread to come back); compartment-aware network mechanisms and because mechanisms for per-silo and per-driver-per silo state are provided. Adding silo awareness to kernel components may be required when the component is a name space provider, when the component interacts with a user-mode service in a 1:1 fashion, when the component defers access to a name space entry to worker threads, when the component attaches to a system process, when a component performs permission checks based on being the local (server silo) system administrator; or when a component performs bug checking. System 200 may also include other components not here shown but well known in the art.

System 200 may include one or more side-by-side server silos 204, 206, 208, etc. in each partition or associated with each drive letter. Each server silo may be associated with its own view of global name spaces including but not limited to those listed above. Each server silo, however, shares a single operating system instance with all the silos on the system. For example, in FIG. 2, infrastructure silo 202 and server silos 204, 206 and 208 may each be associated with their own views (infrastructure silo 202 "sees" the entire system name space, not a view) but are all served by the same kernel operating system instance (kernel 280a). Each server silo may include one or more sessions. For example, server silo 204 includes two sessions, session 204a and 204b, server silo 206 includes two sessions, session 206a and 206b and server silo 208 includes two sessions, session 208a and 208b. It will be understood however, that server silos are not limited to two sessions. Any number of sessions may be initiated and may run concurrently in a server silo. In some embodiments one session (e.g., 204a) runs system services and applications and the other session or session (e.g., 204b, etc.) are reserved for interactive remote terminal server operations or other operations.

A server silo may be administered at least in part by a server silo administrator. For example, the server silo administrator may be able to configure applications running in his silo, and to configure network settings, set firewall rules, specify users who are allowed access to the server silo and so on. A server silo administrator cannot affect any silo except his own. Furthermore, at least some system administration tasks cannot be performed by the server silo administrator. In some embodiments of the invention, a server silo may be initially created only by the administrator of the infrastructure or top-level silo.

Figure 3:
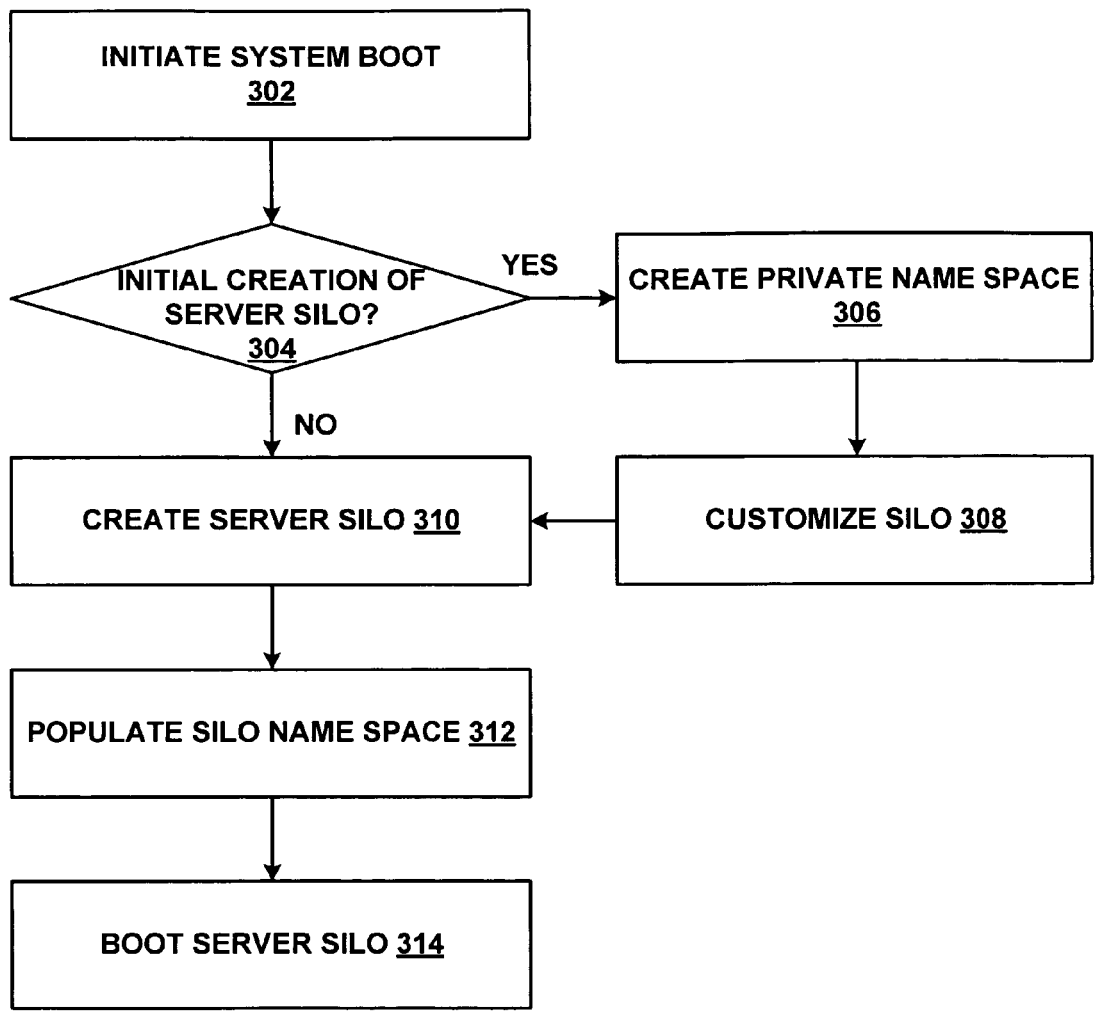
FIG. 3 is a flow chart of a process for creating and maintaining multiple application environments in accordance with some embodiments of the invention.

FIG. 3 is a flow chart of a process for creating multiple application environments in accordance with some embodiments of the invention. Steps 302-312 execute in the infrastructure or top-level silo. Step 314 executes in the server silo. At 302, the base system (the infrastructure silo) is booted, creating all the system name spaces. If a server silo is being created for the first time (304) processing continues at 306. If the server silo has already been created for the first time, processing continues at 310. At 306, silo-specific versions of system name spaces such as but not limited to the file system and registry may be created. Silo-specific name spaces enable a server silo to have its own copy of software. For example, the server silo may have a private or silo-specific copy of WINDOWS that is at C:\WINDOWS in the silo name space. This directory may be created in C:\SILOS\SILO<SILONAME>\WINDOWS\ and may be populated by either copying the existing C:\WINDOWS directory (described more fully below) or by performing a variation of the normal installation procedure for this alternate directory. At 308, the persistent state in these silo-specific name spaces may be customized, (optional) and may involve modifying the files and registry settings for the server silo. Allowing the configuration to be silo-specific provides for increased flexibility and simplification of management, in the sense that the system administrator does not have to perform all of the maintenance. (The server silo administrator may perform at least some of the server silo maintenance.) Silo-specific configuration parameters for kernel components may increase flexibility at the cost of increased management overhead. Examples of possible customizations for the server silo include: some system services may be disabled by editing the registry keys and/or custom directories or software such as DLLs may be added, log files may be modified, changes to customize the set up may be made, users, passwords, icons may be changed and so on. At 310 the server silo is created. At 312 the silo name space is populated. In some embodiments of the invention, the silo name space is populated based on a manifest. That is, the silo creating utility may refer to a manifest associated with the particular silo to create the silo. Virtual junctions may be created from the silo-specific name space(s) to the system name space(s) at this step. At 314 the server silo is booted by starting the first user process. In some embodiments of the invention, (e.g., in WINDOWS, the first user process is SMSS. Each server silo may have its own set and/or version of applications installed within it. In some embodiments of the invention, the processes in the partial silo-specific boot are user mode processes. The user-level partial boot may overwrite certain values set by the system boot to silo-specific values in the private, silo-specific name space. The partial boot of the server silo may continue to populate the silo private name space. In some embodiments of the invention, the name spaces of the server silo are populated at least in part by a partial reboot of the server silo. That is, certain portions of the normal boot sequence are redone to populate the private name spaces of the server silo. The silo mini-boot does not, however, affect or alter the system name space or the name spaces of other silos on the system To illustrate possible ways to create silo-specific versions of system name spaces, the following non-limiting examples are presented. Suppose that during a normal system install the following directories are created:

```
C:\WINDOWS\SYSTEM 32\
               CONFIG
               LOGS
               DRIVERS
       \USERS
       \PROGRAM FILES
```

Suppose further, that a server silo is first being created. A server silo object may be created. Then a server silo private name space may be created. When creating the name space for the server silo, one or more of three options may be available. The server silo may share the system name space with full access (i.e., RW (read-write) access); the server silo may share the system name space with restricted access (i.e., RO (read-only) access), or the server silo may be provided with a private version of the name space. In some embodiments of the invention, the private version of the server silo name space is populated by making a copy of the system name space. Modifications may subsequently be made to the copy. Thus, a name space for the silo may be created, either by creating empty directories or by making copies of one or more of the system directories, such as, for example:

```
C:\SILOS\SILO<SILONAME>\WINDOWS\SYSTEM 32\
                 CONFIG
                 LOGS
                 DRIVERS
    \SILOS\SILO<SILONAME>\USERS
``` in which a copy of the WINDOWS directory and a copy of the USERS directory is made for the server silo. At this point, the server silo image may be customized, that is, the directories may be edited and specific values/files/sub-directories within the directories may be changed, added or removed. Some machine-specific items may be removed to create a more generic image. The silo may be booted and customized interactively, or the customization may occur off-line by direct modification of certain files. The silo name space(s) may be populated. For example:
C:\WINDOWS→C:
  \SILOS\SILO<SILONAME>\WINDOWS\USERS→
C:\SILOS\SILO<SILONAME>\USERS In the above, the first statement copies the contents of the C:\WINDOWS directory to the silo specific directory name space. The second statement copies the contents of the C:\USERS directory to the silo specific directory name space. In the above example, the directory PROGRAM FILES was not copied. In some embodiments a junction or link to the system PROGRAM FILES may be created. In that case the system PROGRAM FILES will be used by the silo and there will be no silo-specific PROGRAM FILES. Alternatively, the system PROGRAM FILES could be copied to the silo name space. For example:
\PROGRAM FILES→C:
  SILOS\SILO<SILONAME>\PROGRAM FILES (RW)

copies the contents of the C:\PROGRAM FILES directory to the silo specific directory name space. The access capabilities of the PROGRAM FILES for the server silo has been specified as read-write (RW), meaning that server silo's version of PROGRAM FILES can be altered. But while the administrator of the server silo would be able to modify, add or delete a program from the server silo's copy of PROGRAM FILES, a server silo administrator would not be able to modify, add or delete a program from the system PROGRAM FILES because a server silo administrator can only affect his own server silo.

Devices for the silo may be a subset of the system devices. For example, the statement:
D:→\DEVICE\HARD DISK VOLUME 4 gives the server silo access to hard disk volume 4. Other hard disks on the system will be invisible and inaccessible to the server silo. Symbolic links, hard links and aliases are set up to link nodes in the server silo name space to nodes in the system name space. Links to kernel objects are set in the server silo-specific name space so that the silo uses the same kernel objects as the rest of the system. When a user logs into the silo, the user will only see silo-specific adaptors, etc. After creating the server silo, the infrastructure silo in some embodiments of the invention, uses a kernel API to create the first user process in the silo, which in some embodiments is a process called SMSS. The first user process in turn starts processes and sessions in the silo which further populate the silo specific name spaces. Each server silo may be provided with a network interface so that from an external view the server silo appears to be a machine on the network. A compartment for the network adaptor may be created and a network adapter for the network interface card (NIC) is added. The silo object manager name space for the adaptor and the registry may be updated with the adaptor parameters. Dynamic updating of the silo name space may also occur.

As described above, a number of different type of name spaces may be created in the silo, including hierarchical name spaces, number spaces, number/name spaces, and network compartments. Access to resources may be controlled by creating a private view of a system name space for a process in a silo. In some embodiments, the view is created by creating a new virtual or silo root node. Additional nodes may be directly or indirectly connected to the new root node. Junctions are created that connect leaf nodes to nodes in the global hierarchy. The global or system hierarchy may be a physical hierarchy stored on volatile storage only or on non-volatile storage as well. Access to resources may also be restricted in some embodiments by creating a view of the system hierarchy in which all sub-root nodes are junctions to the physical directory. Another way to restrict access to resources is implemented by adding a branch for the silo to the system hierarchy. Access to a node by a process is a silo may be restricted by rewriting access capabilities for the branch. Rules may be applied to nodes in the silo hierarchy which override the access capabilities to the node for processes originating from a silo.

In one type of number space, the identifiers within the number space are unique across the system and there are no well known constants which are used as identifiers. A process identifier name space is an example of this kind of number space. Process identifiers are assigned by the kernel. The kernel does not reuse a process identifier for a second process so each process identifier is unique. Therefore each silo will have a set of process identifiers that does not intersect with the sets of process identifiers of other silos. There are no well-known process identifiers that are used. For this type of number space, the kernel object maintains a data structure including the process identifier, the silo to which the process belongs and a pointer to the kernel process object in which the state for the process is stored. When a silo requests a list of processes from the kernel, the kernel will filter the universe of process identifiers and will only return the process identifiers associated with the requesting silo.

The second type of number space is a number/name space in which there are one or more unique identifiers. An example is the LUID name space. Within the LUID name space there are special login identifiers that are created by each silo. For example, every time a guest or anonymous user logs into a machine, a unique number (hex)3e5 may be generated for that login session. Each server silo will have its own anonymous logon session, but will use the same identifier, (hex)3e5, for that session. There are, in addition, special login identifiers that are created by each silo. For example, LUID (hex)3e5 is a special logon identifier. Each silo will have an (hex)3e5 logon identifier. To distinguish one silo's (hex)3e5 from another silo's (hex)3e5, the silo identifier is added to the LUID table maintained by the kernel component that maintains LUIDs. User processes in the server silo still see the LUIDs without the silo identifier. This enables the kernel component to keep track of multiple LUIDs in a common data structure while restricting processes running in the server silo to use of and access to only the LUIDs belonging to the server silo in which the process is running. The same is true for GUIDs. When a silo requests a list of LUIDS or GUIDS from the kernel, the kernel will filter the universe of entries and will only return those associated with the requesting silo. Another example of this kind of name space is when a separate device object is created for the silo's name space. The device object identifies the name space to which it belongs.

Another kind of name space is for network compartments. Each silo receives one or more separate network adaptors and its own set of IP addressed on the adaptor. Each compartment has full IP port name space. Network compartments are combined with kernel services so that network traffic is directed to the appropriate silo. A compartment may be made up of a set of network interfaces in which one network interface cannot be part of multiple compartments. Compartments may provide separate routing tables and port pool. In some embodiments of the invention a compartment provides a scoping of the port space so that applications that need to receive across multiple IP addresses will only interact with traffic on the set of network interfaces which make up the compartment. A session may only be in one compartment at any given point in time.

After the silo is set up and one or more processes are running in the silo, the kernel may receive messages from a silo process. If more than one server silo has been created, the kernel may receive messages from several silo processes. The kernel can tell which silo a process belongs to, because the kernel maintains a table including the process identifier of the process (assigned by the kernel, as described above), which silo the process belongs to and a pointer to a process object in which the state of the process is stored.

Similarly, the kernel can tell if an administrator is the system administrator or just a server silo administrator. Even if a server silo administrator has the highest level of privileges and rights, the server silo administrator is unable to affect any silo but his own. In some embodiments of the invention, the server silo administrator is unable to affect any other silo because the other silo's name space is not accessible to the silo administrator.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

While the present invention has been described in connection with the preferred embodiments of the various figures, it is to be understood that other similar embodiments may be used or modifications and additions may be made to the described embodiments for performing the same function of the present invention without deviating therefrom. Therefore, the present invention should not be limited to any single embodiment, but rather should be construed in breadth and scope in accordance with the appended claims.

What is claimed:

1. A system for creating multiple isolated application environments on a single computer comprising:
    an operating system that creates a top-level silo and a plurality of isolated application environments comprising server silos by performing an additional partial boot of user-level processes within each server silo of the plurality of server silos, wherein the operating system:
        generates a server silo-specific name space for each server silo, the server-silo specific name space restricting access to a set of resources by providing a view of a subset of the set of global resources, the subset comprising global resources accessible to the server silo;
        populates at least a first portion of each server silo-specific name space via a system boot; and
        populates at least a second portion of each server silo-specific name space via the additional partial boot comprising a server silo-specific partial boot of only the server silo.

2. The system of claim 1, wherein:
    the operating system creates at least one silo-specific name space for each server silo, the at least one silo-specific name space providing a view restricting resources available to each server silo, the view comprising a subset of a system name space.

3. The system of claim 2, wherein the at least one server silo-specific name space is a hierarchical name space, a number space, the number space comprising a plurality of identifiers that are unique across the computer, a number/name space, the number/name space comprising a plurality of identifiers that include unique and non-unique identifiers across the computer, or a network compartment space, the network compartment space providing for correct delivery of traffic on a network to a server silo.

4. The system of claim 1, wherein the operating system is distinguishes a process running in a first server silo from a process running in a second server silo.

5. The system of claim 1, wherein a server silo-specific name space is populated based on a manifest associated with a respective server silo.

6. The system of claim 1, wherein the operating system restricts operations performed by a server silo administrator to a server silo owned by the server silo administrator.

7. A method for creating isolated application environments on a single computer comprising:
   creating a server silo, the server silo comprising an isolated application environment for running applications;
   generating a server silo-specific name space for the server silo, the server-silo specific name space restricting access to a set of resources by providing a view of a subset of the set of global resources, the subset comprising global resources accessible to the server silo;
   populating at least a first portion of the server silo-specific name space via a system boot;
   populating at least a second portion of the server silo-specific name space via a silo-specific boot, the server silo-specific boot comprising a partial boot of only the server silo.

8. The method of claim 7, wherein the server silo-specific boot comprises booting a subset of the processes of the system boot for the server silo only.

9. The method of claim 7, wherein the server silo-specific name space is a hierarchical name space wherein at least one node in the hierarchical name space comprises a link to a global name space.

10. The method of claim 7, wherein the hierarchical name space comprises one of a registry, a system object name space or a file system.

11. The method of claim 7, wherein the server silo-specific name space is a number space, wherein each identifier in the number space is a unique number in the computer.

12. The method of claim 11, wherein the number space comprises a process identifier name space.

13. The method of claim 7, wherein the server silo-specific name space is a number/name space wherein each identifier in the number/name space is one of a unique number in the computer or a non-unique number in the computer, the non-unique number comprising a number that is used by multiple applications to represent a particular entity.

14. The method of claim 7, wherein the server-silo specific name space is a network compartment name space of claim 6, wherein the network compartment name space comprises a network adaptor and a set of IP addresses for delivering network traffic to a silo to which the traffic is addressed.

15. The method of claim 7, further comprising:
   performing a system boot that populates a portion of the server silo-specific name space.

16. A computer-readable storage medium comprising computer-executable instructions for:
   creating a server silo, the server silo comprising an isolated application environment for running applications;
   generating a server silo-specific name space for the server silo, the server-silo specific name space restricting access to a set of resources by providing a view of a subset of a set of global resources, the subset comprising resources accessible to the server silo;
   populating at least a first portion of the server silo-specific name space via a system boot;
   populating at least a second portion of the server silo-specific name space via a server silo-specific boot, the server silo-specific boot comprising a partial boot of only the server silo.

17. The computer-readable storage medium of claim 16, comprising further computer-executable instructions for:
   performing a system boot that populates a portion of the server silo-specific name space.

18. The computer-readable storage medium of claim 16, comprising further computer-executable instructions for:
   creating a hierarchical server silo specific name space comprising at least one node comprising a link to a system name space, wherein the hierarchical server silo specific name space comprises a view of the system name space which restricts access of the server silo to system resources.

19. The computer-readable storage medium of claim 16, comprising further computer-executable instructions for:
   creating a server silo specific name space comprising identifiers that are unique in a computer executing the computer-executable instructions and identifiers that are not unique in the computer executing the computer-executable instructions.

20. The computer-readable storage medium of claim 19, comprising further computer-executable instructions for:
   customizing the server silo by modifying registry entries for the server silo.

* * * * *